(12) United States Patent
Mashimo et al.

(10) Patent No.: US 8,551,363 B2
(45) Date of Patent: Oct. 8, 2013

(54) METHOD OF PRODUCING GROUP II-VI COMPOUND SEMICONDUCTOR, METHOD OF PRODUCING GROUP II-VI COMPOUND SEMICONDUCTOR PHOSPHOR, AND HEXAGONAL GROUP II-VI COMPOUND SEMICONDUCTOR

(75) Inventors: Tsutomu Mashimo, Kumamoto (JP);
Omurzak Uulu Emil, Kumamoto (JP);
Makoto Okamoto, Kurashiki (JP);
Hideharu Iwasaki, Kurashiki (JP)

(73) Assignees: National University Corporation Kumamoto University, Kumamoto-shi (JP); Kuraray Co., Ltd., Kurashiki-shi (JP)

( * ) Notice: Subject to any disclaimer, the term of this patent is extended or adjusted under 35 U.S.C. 154(b) by 143 days.

(21) Appl. No.: 12/866,561

(22) PCT Filed: Feb. 5, 2009

(86) PCT No.: PCT/JP2009/052352
§ 371 (c)(1),
(2), (4) Date: Aug. 6, 2010

(87) PCT Pub. No.: WO2009/099250
PCT Pub. Date: Aug. 13, 2009

(65) Prior Publication Data
US 2010/0320426 A1      Dec. 23, 2010

(30) Foreign Application Priority Data
Feb. 6, 2008   (JP) .................................. 2008-026826

(51) Int. Cl.
*C09K 11/54*      (2006.01)
*C09K 11/56*      (2006.01)

(52) U.S. Cl.
USPC ......... 252/301.6 S; 252/301.4 S; 252/301.6 P;
252/519.4; 117/95; 117/106; 117/107; 204/164;
423/566.1; 428/141

(58) Field of Classification Search
USPC .................. 252/519.4, 301.4, 301.6, 301.4 S,
252/301.6 S, 301.6 P; 204/164; 423/566.1,
423/556.1; 428/141; 117/95, 106, 107
See application file for complete search history.

(56) References Cited

U.S. PATENT DOCUMENTS 4,725,563 A * 2/1988 Nishizawa ..................... 117/74
6,303,545 B1   10/2001 Huner et al.
(Continued)

FOREIGN PATENT DOCUMENTS

JP    61 199096         9/1986
JP    05-275339    * 10/1993
(Continued)

OTHER PUBLICATIONS

Extended European Search Report dated Jul. 11, 2013 issued in corresponding European patent application No. 09708883.5.

(Continued)

*Primary Examiner* — Khanh Tuan Nguyen
(74) *Attorney, Agent, or Firm* — Oblon, Spivak, McClelland, Maier & Neustadt, L.L.P.

(57) ABSTRACT

A method of producing a Group II-VI compound semiconductor. The method involves generating a pulsed electrical discharge plasma between metallic electrodes in sulfur to produce a Group II-VI compound semiconductor. A method of producing a Group II-VI compound semiconductor phosphor using a pulsed electrical discharge plasma. A hexagonal crystal of Group II-VI compound semiconductor composed of a plurality of twin crystals.

20 Claims, 4 Drawing Sheets

(56) References Cited

U.S. PATENT DOCUMENTS

| | | |
|---|---|---|
| 2003/0172868 A1 | 9/2003 | Nho et al. |
| 2004/0262577 A1* | 12/2004 | Urabe et al. ............ 252/301.6 S |
| 2006/0127692 A1 | 6/2006 | Takahashi et al. |
| 2006/0255718 A1 | 11/2006 | Matsuda et al. |
| 2009/0166587 A1 | 7/2009 | Tsuji et al. |
| 2009/0246463 A1* | 10/2009 | Akiyoshi et al. .............. 428/141 |

FOREIGN PATENT DOCUMENTS

| | | | |
|---|---|---|---|
| JP | 05-275478 | * | 10/1993 |
| JP | 6 293503 | | 10/1994 |
| JP | 8 183954 | | 7/1996 |
| JP | 9 59616 | | 3/1997 |
| JP | 2002 511517 | | 4/2002 |
| JP | 2004 91233 | | 3/2004 |
| JP | 2004 520260 | | 7/2004 |
| JP | 2005 239857 | | 9/2005 |
| JP | 2005-281380 | * | 10/2005 |
| JP | 2005 281380 | | 10/2005 |
| JP | 2007 284309 | | 11/2007 |
| SU | 860 428 | | 5/1981 |
| WO | 03 020848 | | 3/2003 |
| WO | WO 2007/040161 A1 | * | 4/2007 |
| WO | 2008 013243 | | 1/2008 |
| WO | WO 2008/013243 A1 | * | 1/2008 |

OTHER PUBLICATIONS

Burakov et al. "Synthesis of Nanoparticles Using a Pulsed Electrical Discharge in a Liquid", Journal of Applied Spectroscopy vol. 75, No. 1, 2008, pp. 114-124.

Omurzak et al. "Synthesis Method of Nanomaterials by Pulsed Plasma in Liquid", J. Nanosci. Nanotechnol, 2007, vol. 7, No. 9, pp. 3157-3159.

* cited by examiner

METHOD OF PRODUCING GROUP II-VI COMPOUND SEMICONDUCTOR, METHOD OF PRODUCING GROUP II-VI COMPOUND SEMICONDUCTOR PHOSPHOR, AND HEXAGONAL GROUP II-VI COMPOUND SEMICONDUCTOR

TECHNICAL FIELD

The present invention relates to a method of producing a Group II-VI compound semiconductor, a method of producing a Group II-VI compound semiconductor phosphor, and a hexagonal crystal of Group II-VI compound semiconductor.

BACKGROUND ART

Dry and wet processes are known as the production of a metal sulfide for use in pigments and solid lubricants, such as tin sulfide, zinc sulfide and copper sulfide. Typically, the dry processes comprise reacting a metal with hydrogen sulfide or sulfur at high temperature under atmospheric or higher pressure, or reacting a metal compound and a sulfide such as thioamide in gas phase. Examples of known dry processes include a process comprising reacting highly-reactive metal powder with sulfur (please refer to Patent Document 1), and a process corresponding to the modification of the above-mentioned process that comprises reacting an agglomerate metal with sulfur while the agglomerate metal is milled (please refer to Patent Document 2). Another known dry process comprises reacting a metal chloride and thioacetamide or the like in gas phase (please refer to Patent Document 3).

On the other hand, the wet processes typically comprise reacting an aqueous solution of a metal compound with hydrogen sulfide, sodium hydrosulfide (sodium hydrogen sulfide) or the like. Examples of known wet processes include a process of reacting a metal alkoxide with hydrogen sulfide (please refer to Patent Document 4), a process of reacting a metal salt with sodium sulfide in water (please refer to Patent Document 5) and a process comprising reacting a metal salt with a thioamide such as thioacetamide (Patent Document 6).

To use a metal as raw material for the dry process, it is necessary to process metal ingot into metal powder. In the case of solid sulfur as raw material, powder sulfur should be used for the dry process. In general, powder metal sulfides are used in pigments and solid lubricants. However, most of metal sulfides that are thermally synthesized by the dry process are obtained as a sintered product, and are subjected to a milling step to produce a commercial product.

There is also disclosed a process in which sulfurization of metal is performed by generation of a pulsed electrical discharge plasma in sulfur (please refer to Patent Document 7).

Patent Document 1: JP 2002-511517 A
Patent Document 2: JP 2007-284309 A
Patent Document 3: JP 2004-091233 A
Patent Document 4: JP 06-293503 A
Patent Document 5: WO 2003/020848
Patent Document 6: JP 2004-520260 A
Patent Document 7: USSR No. 860428

DISCLOSURE OF THE INVENTION

Problem to be Solved by the Invention

In the dry processes described in Patent Documents 1 and 2, it is difficult to safely perform the processes, because the processes require contacting an explosive substance such as sulfur with a metal at high temperature. Further, it is difficult to carry out the process described in Patent Document 3 on an industrial scale, because the process requires special facilities for vaporizing and the like.

In the wet processes using metal alkoxides such as those described in Patent Document 4, raw material is easily hydrolyzed into the oxide, which is highly likely to be incorporated into the resulting sulfide product as an impurity. Thus, severe control of the impurities is required to carry out the process. Furthermore, since hydrolysis easily proceeds during the reaction, it is substantially difficult to obtain a high-purity sulfide product. The processes described in Patent Documents 5 and 6 have similar problems; it is difficult to avoid hydrolysis of a raw material and a product during the reactions, and consequently difficult to obtain a high-purity sulfide. Further, since both of the dry and wet processes can produce only the cubic form of metal sulfides that are thermally stable, it has been significantly difficult to obtain the hexagonal crystal from of metal sulfides.

Patent Document 7 describes a production method using a pulsed electrical discharge plasma. However, it does not disclose Group II-VI compound semiconductors including the thermally unstable hexagonal crystal form of metal sulfides.

Nothing is known about pulsed plasma assisted doping of a metal sulfide with a different type of metal element.

An object of the present invention is to provide a method for the stable production of a high-purity Group II-VI compound semiconductor on an industrial scale. It is also an object of the present invention to provide a hexagonal crystal of Group II-VI compound semiconductor into which a metal can be doped easily, and a Group II-VI compound semiconductor phosphor obtained by doping a different type of metal element when a Group II-VI compound semiconductor is produced.

Means for Solving the Problem

The present inventors intensively and extensively conducted studies to achieve the foregoing objects, and consequently found that a Group II-VI compound semiconductor could be obtained by generating a pulsed electrical discharge plasma between metallic electrodes in a sulfurizing agent or a liquid containing a sulfurizing agent (especially in molten sulfur) in the absence of water. Based on this finding, the present invention was completed.

Specifically, the present invention provides:

[1] a method of producing a Group II-VI compound semiconductor, comprising generating a pulsed electrical discharge plasma between metallic electrodes in a sulfurizing agent or a liquid containing a sulfurizing agent to produce a metal sulfide;

[2] the method of [1], wherein the metallic electrodes comprise a Group II metal;

[3] the method of [1] or [2], wherein the sulfurizing agent is sulfur, hydrogen sulfide or an organic sulfur compound;

[4] the method of [19], [2] or [3], wherein the Group II-VI compound semiconductor is zinc sulfide;

[5] the method of [4], wherein the zinc sulfide comprises a hexagonal zinc sulfide crystal composed of a plurality of twin crystals;

[6] a hexagonal crystal of Group II-VI compound semiconductor, which is composed of a plurality of twin crystals;

[7] the hexagonal crystal of Group II-VI compound semiconductor of [6], wherein a distance of the twin crystals spacing of the Group II-VI compound semiconductor is 10 nm or smaller;

[8] the hexagonal crystal of Group II-VI compound semiconductor of [6] or [7], wherein the Group II-VI compound semiconductor is zinc sulfide;

[9] a method of producing a Group II-VI compound semiconductor phosphor, comprising doping an activating agent into a Group II-VI compound semiconductor while generating a pulsed electrical discharge plasma between metallic electrodes in a sulfurizing agent or a liquid containing a sulfurizing agent to produce the Group II-VI compound semiconductor; and

[10] the method of [9], wherein the activating agent is at least one element selected from copper, silver, gold, manganese and rare-earth elements.

Advantages of the Invention

The present invention provides a method of producing a Group II-VI compound semiconductor at high productivity, though the Group II-VI compound semiconductor easily undergoes hydrolysis and the like. The production method of the present invention can also produce a hexagonal crystal of Group II-VI compound semiconductor composed of a plurality of twin crystals into which a metal can be doped easily. Furthermore, the present invention provides a method of producing a Group II-VI compound semiconductor phosphor using a pulsed electrical discharge plasma.

BEST MODE FOR CARRYING OUT THE INVENTION

A method of producing a Group II-VI compound semiconductor of the present invention is characterized in that a pulsed electrical discharge plasma is generated between metallic electrodes in a sulfurizing agent or a liquid containing a sulfurizing agent, especially in molten sulfur. Examples of metallic electrodes include electrodes of Group II metals, including alkaline-earth metals such as magnesium, calcium, strontium and barium, and metals that belong to Group IIB of the Periodic Table such as zinc and cadmium.

These metals may be used singly or in combination. The electrodes may have any shape, such as a stick-shape, a wire-shape and a plate-shape. With regard to size of the electrodes, one of the electrodes may be different in size from the other electrode.

In the present invention, for example sulfur is used as a sulfurizing agent. Any form of sulfur, such as powdery sulfur and rubber-like sulfur, may be used. Sulfur may be used in any of the liquid and solid states. Considering plasma discharge efficiency, the present invention is preferably carried out in partially molten sulfur, most preferably in substantially completely molten sulfur.

In the present invention, hydrogen sulfide or an organic sulfur compound may also be used as a sulfurizing agent. A hydrogen sulfide gas may be dissolved into a solvent to produce a hydrogen sulfide solution prior to use. Alternatively, hydrogen sulfide may be produced by decomposing an organic sulfur compound in the reaction system. Examples of organic sulfur compounds include, but not particularly limited to, thiols such as methanethiol, ethanethiol and thiophenol, disulfides such as isopropyl disulfide and dibutyl disulfide, urea and thioamides such as thioformamide and thioacetamide.

An organic sulfur compound can be used directly, or may be used after being dissolved in a solvent. Examples of solvents that can be used include water and methanol. However, in general an oxygen-containing compound causes an oxidation reaction in parallel to decrease selectivity for the sulfide production. Thus, a less reactive compound can be used, including a saturated hydrocarbon such as hexane, octane and decane and an aromatic hydrocarbon compound such as benzene, toluene and naphthalene. Considering solubility of sulfur compounds, an aromatic hydrocarbon compound may be preferably used.

It is obvious that an amount of an organic sulfur compound to be used depends on a period of time in which a pulsed electrical discharge plasma is generated. At least the organic sulfur compound may be present as a sulfurizing agent in a system. Considering reactivity and production efficiency, it is preferable to maintain a concentration close to a saturation concentration. The present invention may be carried out in a condition in which an organic sulfur compound is suspended.

In the present invention, an activating agent and an optional co-activating agent may be doped simultaneously when a Group II-VI compound semiconductor is produced. Examples of elements that are doped as an activating agent include at least one element selected from copper, silver, gold, manganese and rare-earth elements.

A process of doping at least one element selected from copper, silver, gold, manganese and rare-earth elements is not particularly limited. These elements may be preliminarily alloyed with an electrode material to be used, or may be present together with sulfur or an organic sulfur compound to be reacted.

It is obvious that when at least one of the above-mentioned elements is alloyed with an electrode material, the amount of the element(s) included in the composition of the electrode material varies according to the types of activating agents to be used. Normally, the element(s) may be present in an amount of 1 ppm to 50% by weight. In a case when an amount of the dopant element(s) to be included in the alloy can be adjusted to an appropriate level by chemical treatment after the alloy formation, the element(s) (e.g., copper) may be included and alloyed in an amount of 100 ppm to 50% by weight. In a case when it is difficult to adjust an amount of the element(s) by chemical treatment, the element(s) may be preferably included and alloyed in an amount of 1 to 10% by weight.

In the case when a source of at least one of the dopant element(s) is to be present together with sulfur or an organic sulfur compound to be reacted, a method for the incorporation of the element is not particularly limited. Examples of the compounds used as the source of the activating agents include a sulfide such as copper sulfide, silver sulfide, gold sulfide, manganese sulfide and a rare-earth sulfide, a corresponding mineral acid salt such as a sulfate, a chloride and a nitrate, an organic acid salt such as a formate and an acetate and an organic complex such as acetylacetonate. Considering purity, operability and the like of the resulting phosphor, it is preferable that the source of the dopant element(s) be dissolved or finely dispersed in sulfur or a solution of an organic sulfur compound and not react when it merely comes into contact with the sulfur or the organic sulfur compound. Preferably, an organic acid salt, an organic complex and a sulfide may be used.

Normally, these compounds are added in an amount of 1 ppm to 10% by weight, more preferably 10 ppm to 5% by weight, with respect to an amount of a sulfurizing agent to be used.

In the present invention, a co-activating agent may be optionally added. Examples of co-activating agents that can be used include halogens such as chlorine and bromine, and elements such as aluminum, gallium, indium and iridium. A process for the incorporation of these elements is not particularly limited. The source of these elements may be mixed and reacted with a sulfurizing agent. Examples of compounds used as the source of co-activating agents include a halide, a sulfide such as aluminum sulfide, gallium sulfide, indium sulfide and iridium sulfide, a corresponding mineral acid salt such as a sulfate, a chloride and a nitrate, an organic acid salt such as a formate and an acetate and an organic complex such as acetylacetonate. Considering purity and operability of the resulting phosphor, it is preferable that the above-mentioned compounds be dissolved or finely dispersed in sulfur or an organic sulfur compound solution and not react when it merely comes into contact with the sulfur or the organic sulfur compound. Preferably, a halide, an organic acid salt, an organic complex and a sulfide may be used.

Normally, these compounds are added in an amount of 1 ppm to 10% by weight, more preferably 10 ppm to 5% by weight, with respect to an amount of a sulfurizing agent to be used.

A temperature at which the pulsed plasma discharge is carried out is not particularly limited. Preferably, the pulsed plasma discharge is carried out at a temperature in the range of room temperature to 300° C. An excessively high temperature is not preferred, because it causes an increase in a vapor pressure of sulfur and requires a special reaction vessel. An excessively low temperature is also not preferred, because it leads to a decrease in efficiency of the sulfide production at a time when plasma is created. Since properties of sulfur significantly affect the reactivity, it is preferable that the sulfur be maintained in a molten state, preferably at a temperature in the range of 110 to 200° C., more preferably 120 to 160° C.

In the present invention, a pulsed electrical discharge plasma is generated between metallic electrodes in a sulfurizing agent or a liquid containing a sulfurizing agent, especially in sulfur, to produce a Group II-VI compound semiconductor. A voltage for creating plasma is not particularly limited. Preferably, the voltage is set as 50 to 500 V, preferably, in view of safety and need for a special apparatus, 60 to 400 V, more preferably 80 to 300 V.

An electric current for creating plasma is not particularly limited. It is obvious that the greater the electric current, the more the Group II-VI compound semiconductor is produced. Preferably, the plasma is generated with an electric current of 0.1 to 200 A, and more preferably, in view of energy efficiency, 1 to 100 A.

A pulse interval to generate a pulsed electrical discharge plasma is not particularly limited. A pulse cycle is preferably set as 5 to 100 milliseconds, more preferably 6 to 50 milliseconds.

It is obvious that a pulse duration for one pulse cycle varies according to a voltage and a current to be applied. Normally, the present invention is carried out with a pulse duration of 1 to 50 microseconds; in view of discharge efficiency, the pulse duration is preferably 2 to 30 microseconds.

A waveform of the discharge voltage is not particularly limited. The discharge may be generated by applying sine wave, rectangular wave or triangular wave voltage. In view of efficiency with respect to energy to be discharged, discharge using a rectangular wave is preferred.

A waveform of the discharge current is not particularly limited. The discharge may be generated by applying sine wave, rectangular wave or triangular wave current. In view of efficiency with respect to energy to be discharged, discharge using a rectangular wave is preferred.

In the present invention, the electrodes may be vibrated. Application of vibration is preferred, because it prevents accumulation of a Group II-VI compound semiconductor deposited between the electrodes, thereby enabling efficient discharge. A method for the application of vibration is not particularly limited. Vibrations may be applied periodically or intermittently.

An atmosphere in which the present invention is carried out is not particularly limited. The present invention may be carried out at reduced, increased or normal pressure. Normally, the present invention is carried out in an atmosphere of an inert gas such as nitrogen and argon in view of safety and operability.

A Group II-VI compound semiconductor product is accumulated in a sulfurizing agent or a liquid containing a sulfurizing agent, especially in molten sulfur. Thus, a Group II-VI compound semiconductor can be obtained by a conventional technique, e.g., by dissolving sulfur in a good solvent such as carbon disulfide, and recovering a Group II-VI compound semiconductor as a residual matter. A Group II-VI compound semiconductor can also be obtained by sublimating and removing sulfur in vacuum under the conditions of theremal heating at 200° C.

The Group II-VI compound semiconductor obtained according to the present invention is mainly used as a base material of a phosphor. Thus, the Group II-VI compound semiconductor is preferably zinc sulfide. More preferably, the Group II-VI compound semiconductor is a hexagonal crystal of Group II-VI compound semiconductor composed of a plurality of twin crystals, more preferably hexagonal zinc sulfide crystal composed of a plurality of twin crystals, in view of ease of metal doping. Further, a distance of the twin crystal spacing in the Group II-VI compound semiconductor is most preferably 10 nm or smaller.

The following non-limiting examples describe the present invention in detail.

EXAMPLE 1

In a 300-ml beaker, 200 g of sulfur was charged and melted by heating at 140° C. Cylindrical zinc electrodes (purity: 99% or higher) having a diameter of 5 mm and a length of 100 mm were inserted into the molten sulfur. A distance between the electrodes was set as 1 mm. To prevent accumulation of reaction products on a surface of the electrodes and to thereby increase reaction efficiency, vibrations were applied. The electrodes were connected to an alternating-current power supply, and pulse discharge was carried out at 200 V and 3 A. The discharge was carried out by applying a sine wave voltage and current. The pulse interval was 20 milliseconds. The pulse duration for one pulse cycle was 10 microseconds. When the discharge was started, precipitation of zinc sulfide was observed. The discharge was continued for 5 hours. The precipitated zinc sulfide was heated to 200° C., depressurized to 80 Pa and sublimated to remove sulfur, and the resulting product was washed with 100 g of carbon disulfide, depressurized to 80 Pa and dried with hot air at 100° C. to obtain 5 g of zinc sulfide.

ICP atomic emission spectrometry was carried out, and nothing other than zinc and sulfur was detected. Table 1 shows the results of ICP atomic emission spectrometry and organic carbon analysis.

Figure 1:
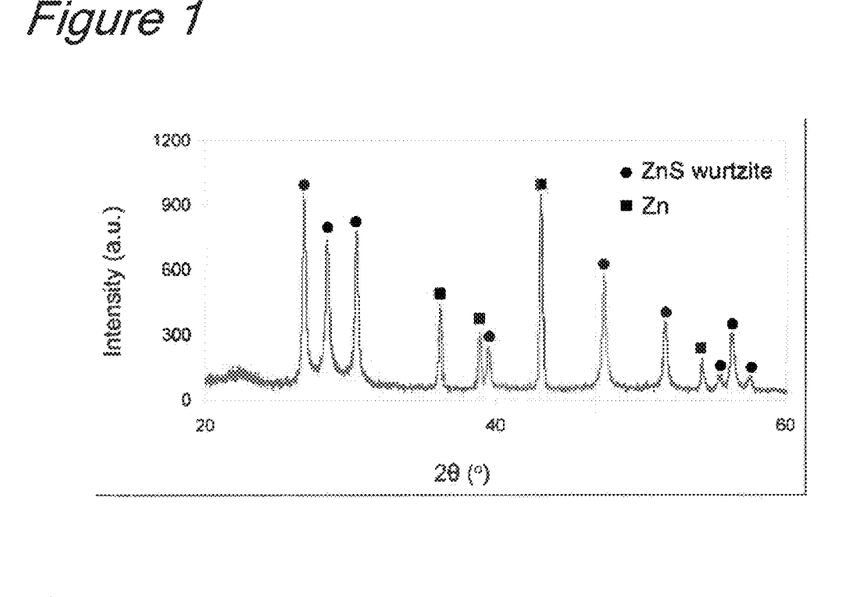
FIG. 1 is a chart showing the results of X-ray structural analysis of zinc sulfide obtained in Example 1.

FIG. 1 shows the results of X-ray structural analysis of the zinc sulfide (by using XRD Cu Kα radiation, Rigaku RINT-2500VHF). Zinc appearing in FIG. 1 was derived from an impurity from the electrodes. It was seen from FIG. 1 that hexagonal zinc sulfide crystals were obtained.

Figure 2:
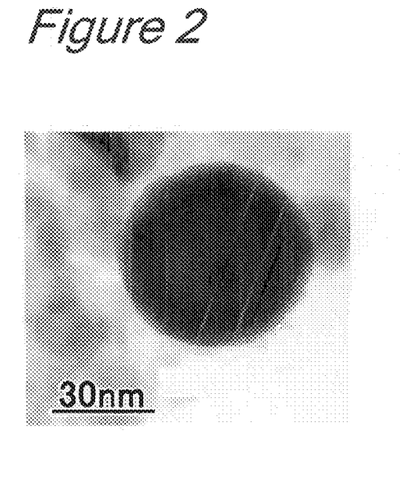
FIG. 2 is a transmission electron microscopic image (magnification: 100000) of the zinc sulfide obtained in Example 1.
Figure 3:
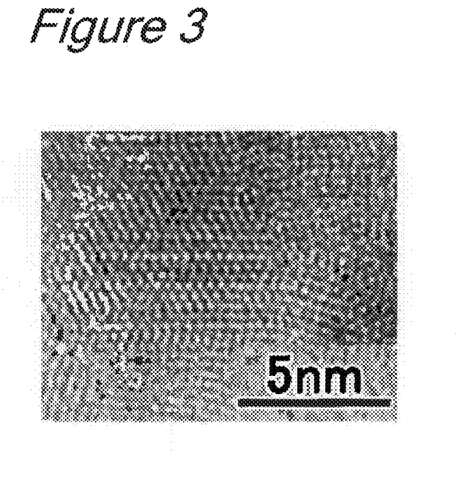
FIG. 3 is a transmission electron microscopic image (magnification: 700000) of the zinc sulfide obtained in Example 1.

FIGS. 2 and 3 show transmission electron microscopic images (TEM Philips Tecnai F20 S-Twin) of the zinc sulfide (magnification: 100000-fold and 700000-fold, respectively). It was seen from FIG. 3 that the zinc sulfide was obtained in the form of a plurality of twin crystals.

Figure 4:
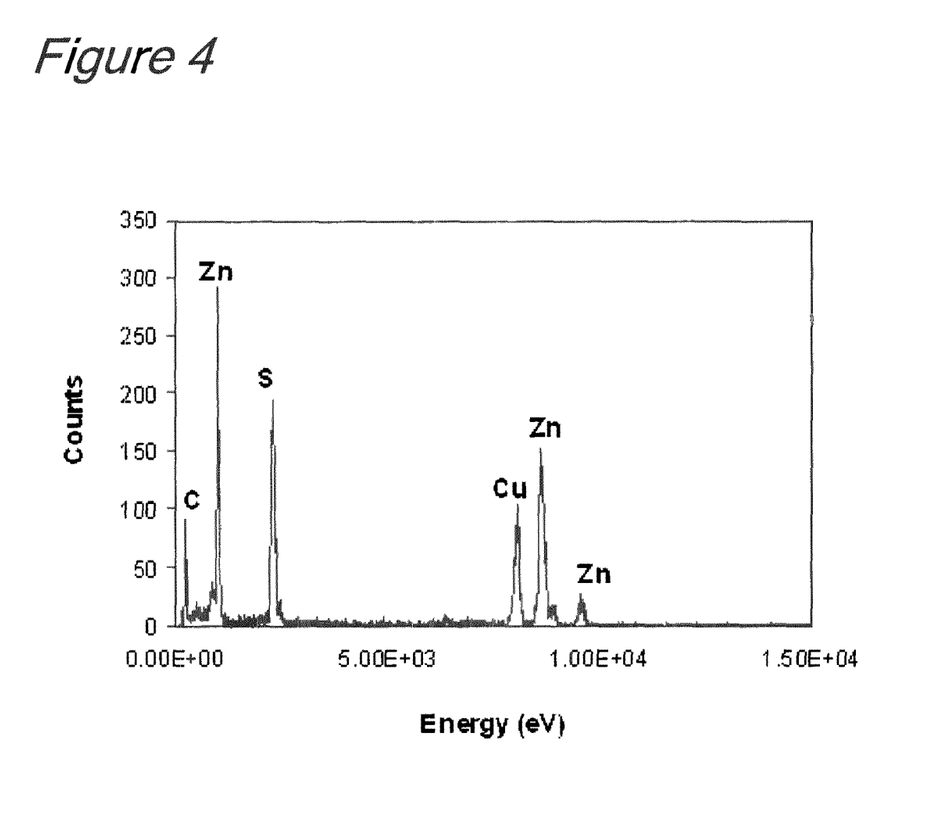
FIG. 4 shows the result of element analysis of the zinc sulfide of Example 1 by a transmission electron microscope EDX.

FIG. 4 shows the results of element analysis of the zinc sulfide by EDX, which was an accessory of the transmission electron microscope (TEM Philips Tecnai F20 S-Twin).

EXAMPLE 2

The procedure of Example 1 was repeated, except that one of the electrodes was changed to magnesium (purity: 99% or higher), to obtain 3.1 g of zinc magnesium sulfide.

ICP atomic emission spectrometry was carried out, and nothing other than zinc, magnesium and sulfur was detected. Table 1 shows the results of ICP atomic emission spectrometry and organic carbon analysis.

Figure 5:
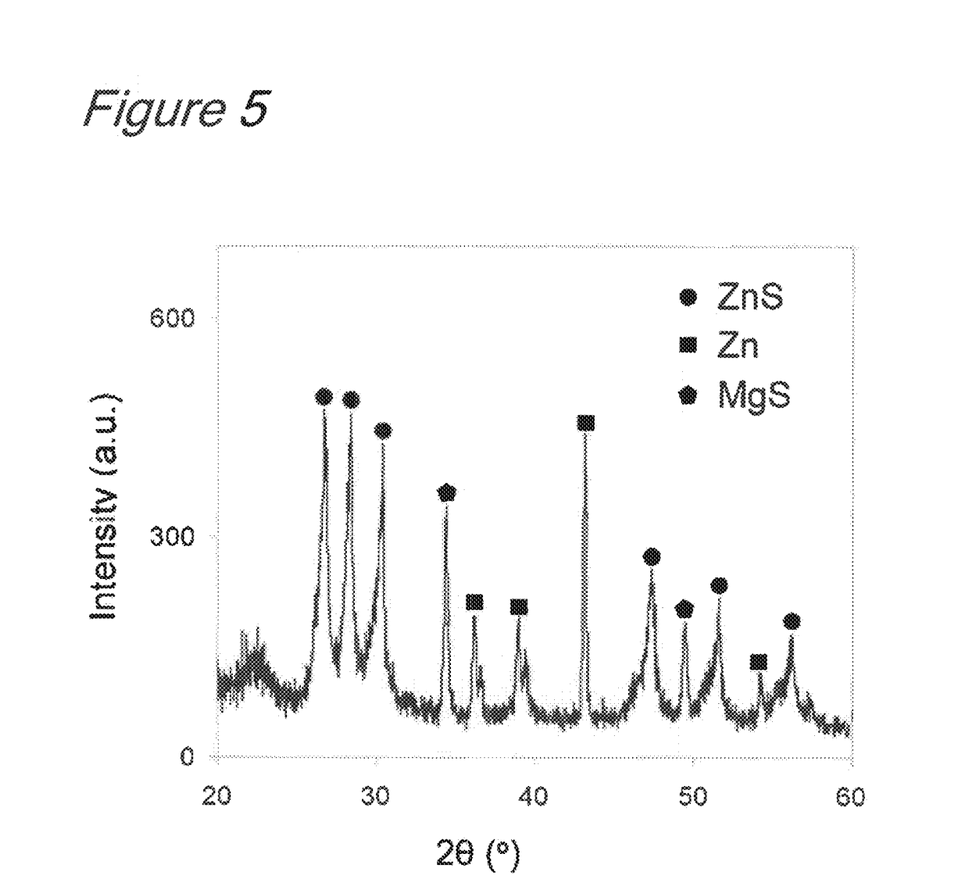
FIG. 5 is a chart showing the results of X-ray structural analysis of zinc sulfide obtained in Example 2.

FIG. 5 shows the results of X-ray structural analysis of the zinc sulfide (by using XRD Cu Kα radiation, Rigaku RINT-2500VHF). Zinc appearing in FIG. 5 was derived from an impurity from the electrodes.

Figure 6:
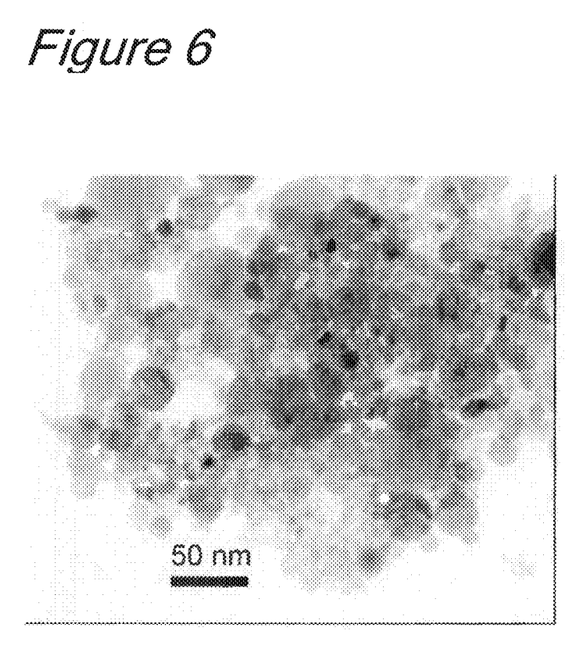
FIG. 6 is a transmission electron microscopic image (magnification: 70000) of the zinc sulfide obtained in Example 2.

FIG. 6 shows the transmission electron microscopy images of the zinc sulfide (TEM Philips Tecnai F20 S-Twin).

EXAMPLE 3

In a 300-ml beaker, 200 g of sulfur was charged and melted by heating at 140° C. A cylindrical zinc electrode (purity: 99% or higher) having a diameter of 5 mm and a length of 100 mm and a brass electrode of the same shape (zinc:copper=74: 26, ratio by weight) were inserted into the molten sulfur. A distance between the electrodes was set as 1 mm. To prevent accumulation of reaction products on a surface of the electrodes and to thereby increase reaction efficiency, vibrations were applied. The electrodes were connected to an alternating-current power supply, and pulse discharge was carried out at 200 V and 3 A. The discharge was carried out by applying sine wave voltage and current. The pulse interval was set as 20 milliseconds. The pulse duration for one pulse cycle was set as 10 microseconds. When the discharge was started, precipitation of zinc sulfide was observed. The discharge was continued for 5 hours. The precipitated zinc sulfide was heated to 200° C., depressurized to 80 Pa and sublimated to remove sulfur, and the resulting product was washed with 100 g of carbon disulfide, depressurized to 80 Pa and dried with hot air at 100° C. to obtain 5 g of copper-doped phosphor. The phosphor was washed with 200 ml of an aqueous solution containing 1% sodium cyanide and further washed with ion exchanged water until cyanide ions were no longer detected. The phosphor thus washed was depressurized to 80 Pa and dried with hot air at 100° C. to obtain 3 g of copper-doped phosphor.

Table 1 shows the results of ICP atomic emission spectrometry and organic carbon analysis.

EXAMPLE 4

In a 300-ml beaker, 200 g of sulfur was charged and melted by heating at 140° C. In the resulting molten sulfur, 2000 ppm of copper sulfide was dissolved. Cylindrical zinc electrodes (purity: 99% or higher) having a diameter of 5 mm and a length of 100 mm were inserted into the mixture. A distance between the electrodes was set as 1 mm. To prevent accumulation of reaction products on a surface of the electrodes and to thereby increase reaction efficiency, vibrations were applied. The electrodes were connected to an alternating-current power supply, and pulse discharge was carried out at 200 V and 3 A. The discharge was carried out using sine wave voltage and current. The pulse interval was set as 20 milliseconds. The pulse duration for one pulse cycle was set as 10 microseconds. When the discharge was started, precipitation of zinc sulfide was observed. The discharge was continued for 5 hours. The precipitated zinc sulfide was heated to 200° C., depressurized to 80 Pa and sublimated to remove sulfur, and the resulting product was washed with 100 g of carbon disulfide, depressurized to 80 Pa and dried with hot air at 100° C. to obtain 5 g of copper-doped phosphor. The phosphor was washed with 200 ml of an aqueous solution containing 1% sodium cyanide and further washed with ion exchanged water until cyanide ions were no longer detected. The phosphor thus washed was depressurized to 80 Pa and dried with hot air at 100° C. to obtain 3 g of copper-doped phosphor.

Table 1 shows the results of ICP atomic emission spectrometry and organic carbon analysis.

EXAMPLE 5

In a 300-ml beaker, 200 g of sulfur was charged and melted by heating at 140° C. In the resulting molten sulfur, 2000 ppm of copper sulfide was dissolved. Cylindrical zinc electrodes (purity: 99% or higher) having a diameter of 5 mm and a length of 100 mm were inserted into the mixture. A distance between the electrodes was fixed at 1 mm. To prevent accumulation of reaction products on a surface of the electrodes to increase reaction efficiency, vibrations were applied. The electrodes were connected to an alternating-current power supply, and pulse discharge was carried out at 200 V and 3 A. The discharge was carried out by applying rectangular wave voltage and current. The pulse interval was set as 20 milliseconds. The pulse duration for one pulse cycle was set as 10 microseconds. When the discharge was started, precipitation of zinc sulfide was observed. The discharge was continued for 5 hours. The precipitated zinc sulfide was heated to 200° C., depressurized to 80 Pa and sublimated to remove sulfur, and the resulting product was washed with 100 g of carbon disulfide, depressurized to 80 Pa and dried with hot air at 100° C. to obtain 11 g of copper-doped phosphor. The phosphor was washed with 200 ml of an aqueous solution containing 1% sodium cyanide and further washed with ion exchanged water until cyanide ions were no longer detected. The phosphor thus washed was depressurized to 80 Pa and dried with hot air at 100° C. to obtain 8 g of copper-doped phosphor.

EXAMPLE 6

In a 300-ml beaker, 200 g of sulfur was charged and melted by heating at 140° C. A cylindrical zinc electrode (purity: 99% or higher) having a diameter of 5 mm and a length of 100 mm and a brass electrode of the same shape (zinc:copper=74:

26, ratio by weight) were inserted into the molten sulfur. A distance between the electrodes was set as 1 mm. To prevent accumulation of reaction products on a surface of the electrodes and to thereby increase reaction efficiency, vibrations were applied. The electrodes were connected to an alternating-current power supply, and pulse discharge was carried out at 200 V and 3 A. The discharge was carried out by applying rectangular wave voltage and current. The pulse interval was set as 20 milliseconds. The pulse duration for one pulse cycle was set as 10 microseconds. When the discharge was started, precipitation of zinc sulfide was observed. The discharge was continued for 5 hours. The precipitated zinc sulfide was heated to 200° C., depressurized to 80 Pa and sublimated to remove sulfur, and the resulting product was washed with 100 g of carbon disulfide, depressurized to 80 Pa and dried with hot air at 100° C. to obtain 5 g of copper-doped phosphor. The phosphor was washed with 200 ml of an aqueous solution containing 1% sodium cyanide and further washed with ion exchanged water until cyanide ions were no longer detected. The phosphor thus washed was depressurized to 80 Pa and dried with hot air at 100° C. to obtain 5.2 g of copper-doped phosphor.

Table 1 shows the results of ICP atomic emission spectrometry and organic carbon analysis.

EXAMPLE 7

In a 300-ml beaker, 200 g of sulfur was charged and melted by heating at 140° C. A cylindrical zinc electrode (purity: 99% or higher) having a diameter of 5 mm and a length of 100 mm and a brass electrode of the same shape (zinc:copper=74: 26, ratio by weight) were inserted into the molten sulfur. A distance between the electrodes was set as 1 mm. To prevent accumulation of reaction products on a surface of the electrodes and to thereby increase reaction efficiency, vibrations were applied. The electrodes were connected to an alternating-current power supply, and pulse discharge was carried out at 200 V and 3 A. The discharge was carried out by applying rectangular wave voltage and current. The pulse interval was set as 10 milliseconds. The pulse duration for one pulse cycle was set as 20 microseconds. When the discharge was started, precipitation of zinc sulfide was observed. The discharge was continued for 5 hours. The precipitated zinc sulfide was heated to 200° C., depressurized to 80 Pa and sublimated to remove sulfur, and the resulting product was washed with 100 g of carbon disulfide, depressurized to 80 Pa and dried with hot air at 100° C. to obtain 5 g of copper-doped phosphor. The phosphor was washed with 200 ml of an aqueous solution containing 1% sodium cyanide and further washed with ion exchanged water until cyanide ions were no longer detected. The phosphor thus washed was depressurized to 80 Pa and dried with hot air at 100° C. to obtain 11.3 g of copper-doped phosphor.

Table 1 shows the results of ICP atomic emission spectrometry and organic carbon analysis.

EXAMPLE 8

In a 300-ml beaker, 200 g of sulfur was charged and melted by heating at 140° C. In the resulting molten sulfur, 2000 ppm of silver sulfide was dissolved. Cylindrical zinc electrodes (purity: 99% or higher) having a diameter of 5 mm and a length of 100 mm were inserted into the mixture. A distance between the electrodes was set as 1 mm. To prevent accumulation of reaction products on a surface of the electrodes and to thereby increase reaction efficiency, vibrations were applied. The electrodes were connected to an alternating-current power supply, and pulse discharge was carried out at 200 V and 3 A. The discharge was carried out by applying rectangular wave voltage and current. The pulse interval for one pulse cycle was set as 20 milliseconds. The pulse duration was set as 10 microseconds. When the discharge was started, precipitation of zinc sulfide was observed. The discharge was continued for 5 hours. The precipitated zinc sulfide was heated to 200° C., depressurized to 80 Pa and sublimated to remove sulfur, and the resulting product was washed with 100 g of carbon disulfide, depressurized to 80 Pa and dried with hot air at 100° C. to obtain 11 g of copper-doped phosphor. The phosphor was washed with 200 ml of an aqueous solution containing 1% sodium cyanide and further washed with ion exchanged water until cyanide ions were no longer detected. The phosphor thus washed was depressurized to 80 Pa and dried with hot air at 100° C. to obtain 8 g of copper-doped phosphor.

Table 1 shows the results of ICP atomic emission spectrometry and organic carbon analysis.

EXAMPLE 9

In a 300-ml beaker, 200 g of sulfur was charged and melted by heating at 140° C. In the resulting molten sulfur, 2% by weight of manganese acetate was dissolved. Cylindrical zinc electrodes (purity: 99% or higher) having a diameter of 5 mm and a length of 100 mm were inserted into the mixture. A distance between the electrodes was set as 1 mm. To prevent accumulation of reaction products on a surface of the electrodes and to thereby increase reaction efficiency, vibrations were applied. The electrodes were connected to an alternating-current power supply, and pulse discharge was carried out at 200 V and 3 A. The discharge was carried out by applying rectangular wave voltage and current. The pulse interval was set as 20 milliseconds. The pulse duration for one pulse cycle was set as 10 microseconds. When the discharge was started, precipitation of zinc sulfide was observed. The discharge was continued for 5 hours. The precipitated zinc sulfide was heated to 200° C., depressurized to 80 Pa and sublimated to remove sulfur, and the resulting product was washed with 100 g of carbon disulfide, depressurized to 80 Pa and dried with hot air at 100° C. to obtain 11 g of copper-doped phosphor. The phosphor was washed with 200 ml of an aqueous solution containing 1% sodium cyanide and further washed with ion exchanged water until cyanide ions were no longer detected. The phosphor thus washed was depressurized to 80 Pa and dried with hot air at 100° C. to obtain 8 g of copper-doped phosphor.

Table 1 shows the results of ICP atomic emission spectrometry and organic carbon analysis.

Comparative Example 1

Conventional Art Different from the Present Invention

In 200 ml of ion exchanged water, 15.1 g (0.1 mol) of zinc acetate and 15 g (0.2 mol) of thioacetamide were dissolved. Then, 1.2 g of acetic acid was added, and the resulting mixture was heated to 90° C. and stirred for 1 hour. The mixture was cooled to room temperature, and the supernatant liquid was removed by decantation. The product was washed five times with 500 ml of ion exchanged water. The resulting zinc sulfide was dried with hot air at 120° C. to obtain 9.1 g of zinc sulfide.

Table 1 shows the results of ICP atomic emission spectrometry and organic carbon analysis of the resulting zinc sulfide.

TABLE 1

| Example No. | Zn | Mg | Cu | Ag | Mn | Organic carbon content |
|---|---|---|---|---|---|---|
| Example 1 | 69.17 wt % | | | | | |
| Example 2 | 57.07 wt % | 7.95 wt % | | | | |
| Example 3 | 64.22 wt % | | 4.91 wt % | | | |
| Example 4 | 69.31 wt % | | 129 ppm | | | |
| Example 5 | 69.30 wt % | | 417 ppm | | | |
| Example 6 | 65.22 wt % | | 5.17 wt % | | | |
| Example 7 | 65.33 wt % | | 5.74 wt % | | | |
| Example 8 | 69.32 wt % | | | 555 ppm | | |
| Example 9 | 69.27 wt % | | | | 2212 ppm | |
| Comparative Example 1 | 69.03 wt % | | | | | 2100 ppm |

Comparative Example 2

In a 300-ml beaker, 200 g of sulfur was charged and melted by heating at 140° C. Cylindrical zinc electrodes (purity: 99% or higher) having a diameter of 5 mm and a length of 100 mm were inserted into the molten sulfur. A distance between the electrodes was set as 1 mm. To prevent accumulation of reaction products on a surface of the electrodes to increase reaction efficiency, vibrations were applied. The electrodes were connected to a direct-current power supply, and continuous discharge was carried out at 200 V and 4 A. At the start of the discharge, the sulfur turned black. An intended product was not obtained, and only a polymerization product of sulfur was obtained.

Comparative Example 3

In a 300-ml beaker, 200 g of sulfur was charged and melted by heating at 140° C. Cylindrical zinc electrodes (purity: 99% or higher) having a diameter of 5 mm and a length of 100 mm were inserted into the molten sulfur. A distance between the electrodes was set as 1 mm. To prevent accumulation of reaction products on a surface of the electrodes and to thereby increase reaction efficiency, vibrations were applied. The electrodes were connected to a direct-current power supply, and continuous discharge was carried out at 100 V and 2 A. At the start of the discharge, sulfur lost flowability. An intended product was not obtained.

Industrial Applicability

The production method of the present invention produces a Group II-VI compound semiconductor, which easily undergoes hydrolysis and the like, at higher productivity, and also a hexagonal crystal of Group II-VI compound semiconductor composed of a plurality of twin crystals in which a metal can be doped easily. Such a Group II-VI compound semiconductor can be suitably used as a base material of a phosphor.

The invention claimed is:

1. A method of producing a Group II-VI compound semiconductor, comprising:
    generating a pulsed electrical discharge plasma between metallic electrodes in molten sulfur, or in a liquid comprising a sulfurizing agent selected from the group consisting of sulfur, hydrogen sulfide, and an organic sulfur compound, wherein at least one of the metallic electrodes comprises a Group II metal; and
    reacting the Group II metal of the metallic electrode with sulfur from the molten sulfur or from the sulfurizing agent, to obtain a Group II-VI compound semiconductor.

2. The method of claim 1, wherein the Group II-VI compound semiconductor is zinc sulfide.

3. The method of claim 2, wherein the zinc sulfide is in a form of hexagonal zinc sulfide crystal comprising a plurality of twin crystals.

4. The method of claim 1, wherein the pulsed electrical discharge plasma is generated between metallic electrodes in the liquid comprising the sulfurizing agent.

5. The method of claim 4, wherein the sulfurizing agent is sulfur.

6. The method of claim 4, wherein the sulfurizing agent is hydrogen sulfide.

7. The method of claim 4, wherein the sulfurizing agent is an organic sulfur compound.

8. The method of claim 1, wherein the pulsed electrical discharge plasma is generated between metallic electrodes in molten sulfur.

9. A method of producing a Group II-VI compound semiconductor phosphor, comprising:
    generating a pulsed electrical discharge plasma between metallic electrodes in molten sulfur, or in a liquid comprising a sulfurizing agent selected from the group consisting of sulfur, hydrogen sulfide, and an organic sulfur compound, wherein at least one of the metallic electrodes comprises a Group II metal;
    reacting the Group II metal of the metallic electrode with sulfur from the molten sulfur or from the sulfurizing agent, to form a Group II-VI compound semiconductor; and
    doping the Group II-VI compound semiconductor, as it forms, with an activating agent;
    to obtain a Group II-VI compound semiconductor phosphor.

10. The method of claim 9, wherein the activating agent is at least one element selected from the group consisting of copper, silver, gold, manganese and a rare-earth element.

11. The method of claim 9, wherein the pulsed electrical discharge plasma is generated between metallic electrodes in the liquid comprising the sulfurizing agent.

12. The method of claim 11, wherein the sulfurizing agent is sulfur.

13. The method of claim 11, wherein the sulfurizing agent is hydrogen sulfide.

14. The method of claim 11, wherein the sulfurizing agent is an organic sulfur compound.

15. The method of claim 9, wherein the pulsed electrical discharge plasma is generated between metallic electrodes in molten sulfur.

16. The method of claim 9, wherein at least one of the metallic electrodes comprises the activating agent.

17. The method of claim 9, wherein the pulsed electrical discharge plasma is generated between metallic electrodes in the liquid comprising the sulfurizing agent, wherein the liquid further comprises the activating agent.

18. The method of claim 9, wherein the activating agent is copper.

19. The method of claim 9, wherein the activating agent is silver.

20. The method of claim 9, wherein the activating agent is manganese.

* * * * *